July 12, 1927.
H. F. BICKEL
1,635,737
LIGHT AND LOAD FREIGHT BRAKE
Filed March 12, 1926    2 Sheets-Sheet 1
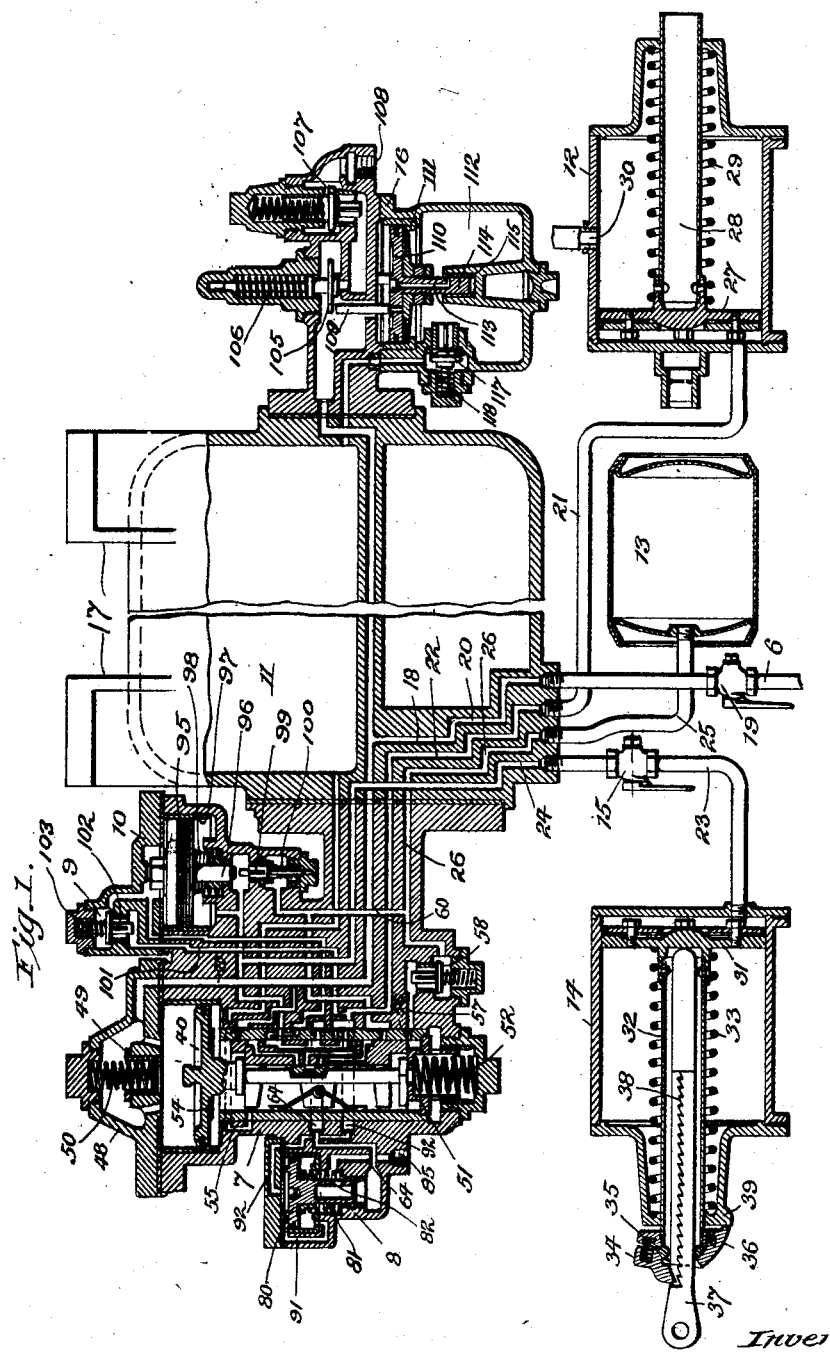

July 12, 1927.
H. F. BICKEL
1,635,737
LIGHT AND LOAD FREIGHT BRAKE
Filed March 12, 1926 2 Sheets-Sheet 2
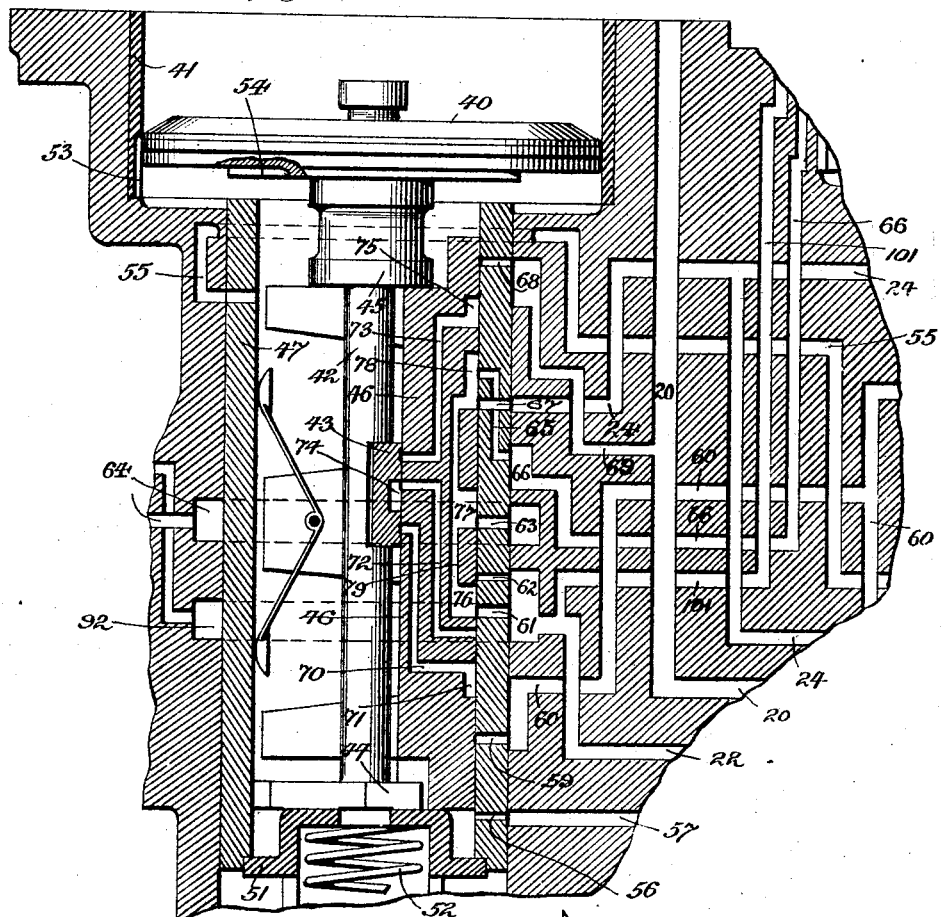
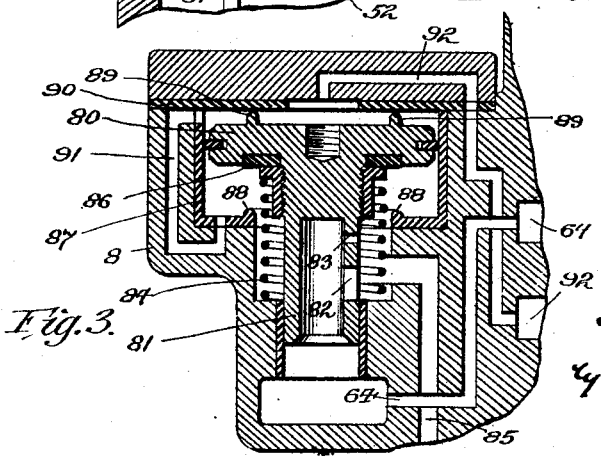
Inventor
Henry F. Bickel
by Dalys ...
Attorney Patented July 12, 1927.

1,635,737

UNITED STATES PATENT OFFICE.

HENRY F. BICKEL, OF PLAINFIELD, NEW JERSEY, ASSIGNOR TO THE NEW YORK AIR BRAKE COMPANY, A CORPORATION OF NEW JERSEY.

LIGHT AND LOAD FREIGHT BRAKE.

Application filed March 12, 1926. Serial No. 94,309.

This invention relates to fluid pressure brakes and particularly to a triple valve mechanism having various novel functions. To develop the full possibilities of the valve it is shown as applied to a two cylinder brake system of the so called "light and load" type having an auxiliary reservoir and a load reservoir, but certain features, notably the retarded release valve, are available for general use.

The light and load functions are secured by the use of a simple stop valve to cut out and in the secondary or "load" cylinder, the service cylinder being always effective. Means are provided to delay the action of the load cylinder in any event, until the service cylinder shall have taken up the slack. This permits the use of a smaller load reservoir than otherwise would be needed, because the travel of the load piston is minimized.

Restricted recharge is secured in the conventional manner, by causing the triple piston to over travel against spring resistance. It has the additional effect of suspending the charging of the load reservoir.

Restricted release is not accomplished by over travel of the triple valve, but is effected by a valve mechanism subject to service brake cylinder pressure. Any application in which this exceeds a chosen value, will be followed by retarded release. The release from the load cylinder is controlled by the same valve.

Service applications are accompanied by local brake pipe venting to the brake cylinder. This is suspended in full service and in emergency.

Emergency applications are somewhat similar to full service application but are accelerated by local train pipe venting effected by independent vent valves associated with each triple valve and involve the addition of the load reservoir volume to the auxiliary reservoir volume.

In both service and emergency applications the first effect is to admit air from the auxiliary reservoir to the service brake cylinder. This builds up brake cylinder pressure and takes up the slack. When brake cylinder pressure reaches a chosen value, determined by design, air is admitted from the load reservoir to the load cylinder. In ordinary service applications each brake cylinder and its reservoir is disconnected from the other, but in emergency they are connected so that pressures equalize even though the load cylinder be cut out.

A practical embodiment of the invention is illustrated in the accompanying drawing, in which, Fig. 1 is a sectional diagram of the brake equipment for a single car, in release position.

Fig. 2 shows a fragment of the triple valve portion of Fig. 1 on a greatly enlarged scale, permitting the ports and passages to be readily traced.

Fig. 3 is a section of the restricted release valve on an enlarged scale.

In the drawings the location of certain ports and passages, particularly those in the triple valve portion, have been modified to bring all ports into the plane of section. Greater compactness may be secured by other obvious arrangements, without functional change.

Generally stated, the equipment of a single car includes a brake pipe 6; a triple valve mechanism 7 which controls release, recharge and application; a restricted release valve 8 which may or may not exert a secondary control during release, according to the pressure reached by an application; a delay mechanism 9 which delays the action of the load cylinder until the service cylinder has taken up the slack; a load cylinder application valve 10 which controls the pressure admitted to the load cylinder; an auxiliary reservoir 11 which furnishes under control of triple valve 7, air to operate service brake cylinder 12; a smaller load reservoir 13 which furnishes under the conjoint control of triple valve 7 and application valve 10 the air to operate load brake cylinder 14; a cut out lock 15 for load brake cylinder 14; and a vent valve mechanism 16 which is independently controlled by brake pipe pressure, and acts to vent the brake pipe rapidly, if brake pipe pressure is reduced at a rate faster than the service rate.

The above reference numerals are applied to the parts generally preparatory to detailed descriptions of each.

The auxiliary reservoir 11 acts as a support for the various valve mechanisms which are bolted to ported faces in a familiar manner, so as to produce a pipeless structure.

The reservoir 11 is supported by brackets 17 and is formed with ported body 18 to which all pipe connections are made.

The brake pipe 6, which has a stop cock 19 connects with brake pipe port 30. The service brake cylinder 12 is connected by a pipe 21 with port 22. The load brake cylinder 14 is connected by pipe 23 (controlled by cock 15) with port 24. The load reservoir 13 is connected by pipe 25 with port 26.

The service brake cylinder 12 follows standard construction, its piston being shown at 27, tubular piston rod at 28 and return spring at 29. At 30 is a connection for a pneumatic slack adjuster (not shown) which preferably is used to maintain constant travel of piston 27.

The brake cylinder 14 is also of standard construction as to its piston 31, tubular rod 32 and return spring 33. Instead, however, of being connected with the foundation brake gear by a simple thrust rod in tubular piston rod 32, as is usual, the piston rod 32 carries at its outer end a special ratchet mechanism. This includes a pivoted dog 34 urged in engaging direction by spring 35. A lug 36 holds dog 34 retracted when piston rod 32 is completely retracted. The thrust rod 37 is positively connected with the foundation gear, and moves outward relatively to piston rod 32 when service brake cylinder piston 27 starts to apply the brakes. Rod 37 has ratchet teeth 38 arranged to be positively engaged by dog 34 when piston rod 32 starts outward. Lug 36 then clears the piston rod guide 39 and allows dog 34 to engage.

It is characteristic of the present invention that no pressure is admitted to cylinder 14 until pressure in cylinder 12 has risen to a value sufficient to take up the slack. (Five pounds per square inch is a suitable value.) Hence the travel of piston 31 in cylinder 14 is short and reservoir 13 can be relatively small.

The triple valve portion 7 (see particularly Fig. 2) conforms in its main elements to standard practice. There is a triple piston 40 working in cylinder bushing 41. The stem 42 positively shifts a graduating valve 43, and shifts with lost motion defined by shoulders 44 and 45 the triple slide valve 46. The graduating valve 43 rides on the back of the triple slide valve 46 and controls ports therein, while slide valve 46 slides on and controls ports in a seat formed in bushing 47. The front cap of the triple valve is shown at 48.

The piston 40 is controlled near the respective limits of its motions by a graduating cup 49 and spring 50 in front cap 48, and by a retard stop 51 and retard spring 52. The graduating spring gives the proper reaction against emergency action, and the retard spring regulates restricted recharge. Recharge is through groove 53, and is restricted to the capacity of restricting feed groove 54 when piston 40 seats against the end of bushing 47. The parts of the triple valve so far described conform generally with standard practice.

The auxiliary reservoir 11 is constantly connected with the valve chamber within bushing 47 by port 55. The load reservoir 13 is charged from the valve chamber by way of port 56, passage 57 and passage 26, but back flow is prevented by charging check 58. The port 56 is blanked by valve 46 in retarded release position, but is open at all other times. The check valve 58 is by-passed by a port 59 and passage 60, but the port 59 is blanked by valve 46, and hence is functionless, in all positions except emergency. In emergency it permits air to flow from reservoir 13 to the triple valve chamber, regardless of valve 58 and whether load cylinder cut-out valve 15 be open or closed.

Port 61 is the service brake cylinder port and leads directly to passage 22. Port 62 is a brake pipe service vent port and also leads to passage 22.

Port 63 is the exhaust port and is connected by passage 64 with atmosphere through the restricted release valve 8.

Port 65 is the exhaust port through which actuating pressure arriving by passage 66 is vented from the piston of the load cylinder actuating valve 10.

Port 67 is the load cylinder port, being connected with passage 24.

Port 68 is a brake pipe vent port connected by branch port 69 with brake pipe port 20.

The triple slide valve 46 has a service port 70 leading from its top face to a recess 71 in the bottom face of the valve. The upper end is controlled by graduating valve 43 being opened thereby in application positions and closed in lap and release positions. The recess 71 registers with service brake cylinder port 61 in all application positions.

The valve 46 has a vent port 72 and a vent port 73 which terminate in the top face of the valve and are bridged in application positions, only, by a recess 74 in graduating valve 43. Each leads to the bottom face of the valve, and 73 there terminates in an enlarged recess 75. In service, but not in full service nor in emergency ports 68 and 62 are connected by way of 75, 73, 74 and 72 affording a restricted vent from brake pipe to brake cylinder.

The valve 46 has in its lower face three recesses 76, 77 and 78 connected by passage 79. In release and restricted release recess 77 registers with exhaust port 63. The connected recess 76 registers with service brake cylinder port 61 thus exhausting the service brake cylinder and certain connected spaces hereinafter described; at the same time recess 78 registers with ports 65 and 67 thus venting the load cylinder actuating valve, and the load brake cylinder together with certain connected spaces to be described.

It will be observed that all these exhausts pass through and are controlled by the restricted release valve 8. This valve includes a piston 80 and a tubular stem 81 formed with a free exhaust port 82 and a restricted exhaust port 83. The piston is normally held up by a spring 84 so that both ports 82 and 83 communicate with vent passage 85. The exhaust port 64 communicates with the bore of stem 81 so that when piston 80 is up free exhaust occurs.

The piston 80 carries on its lower face a gasket 86 and works in a bushing 87 having a rib 88 against which gasket 86 seats when the piston is in its lower (exhaust restricting) position. The piston also has on its upper side an annular rib 89 of less diameter than the piston, which in the upper or free exhaust position of the piston seats against a gasket 90. A port 91 connects the space outside rib 89 with the space below piston 80. A passage 92 connects service brake cylinder port 61 with the space above piston 80 and within annular rib 89.

When service brake cylinder builds up to a chosen value (say 25 pounds per square inch) the pressure acting within rib 89 starts piston 80 downward and the sudden increase of area causes it to go all the way and seat on rib 88. After this has occurred, release will be at a restricted rate until brake cylinder pressure is largely dissipated. This controls exhaust from both brake cylinders, and in fact from the entire apparatus.

The load cylinder application valve includes a piston 95 with stem 96 working in cylinder bushing 97. A spring 98 urges the piston 95 upward, and normally maintains it in this position. When the piston 95 is forced downward the stem 96 strikes the pilot of a check valve 99, and opens this valve. The valve is subject in a closing direction to pressure from load reservoir 13 arriving through port 60, and is also urged closed by a spring 100. The space below piston 95 and the discharge side of valve 99 are in direct communication with load cylinder port 24, so that when valve 99 is opened load reservoir air flows to the load brake cylinder, and as brake cylinder pressure rises the piston 95 is forced upward producing a graduated closure of valve 99.

The space above piston 95 is fed with pressure fluid from service brake cylinder passage 22 arriving through passage 101 and delay mechanism 9. This delay mechanism is a check valve 102 having a loading spring 103 exerting a chosen back pressure here, assumed for example to be 5 pounds per square inch. Since the check valve precludes back flow it is necessary to provide the passage 66 and port 65 already described to vent pressure during release from the space above piston 95.

A branch of brake pipe port 20 leads to the vent valve mechanism 16. Here there is a brake pipe vent check 105 held seated by a spring 106 and by brake pipe pressure. When valve 105 is open brake pipe air is vented through a spring held check valve 107 to atmospheric exhaust port 108.

The valve 105 is forced open in emergency by a stem 109 on piston 110. The piston 110 works in a bushing 111 and is balanced between brake pipe pressure and confined pressure in a small chamber 112, but does not completely isolate the brake pipe from the chamber. Instead there is a combined feed and vent port 113 which is formed in a stem 114 in piston 110. The end of this port within chamber 112 is carried by the movement of piston 110 into and out of bushing 115 within which stem 114 loosely fits.

When brake pipe pressure predominates piston 110 moves down and the feed to chamber 112 is throttled by bushing 115. If a service reduction of brake pipe pressure is made, piston 110 moves up until arrested by valve 105 and in such position port 113 bleeds chamber 112 at the service rate. If brake pipe pressure is reduced at a faster than service rate port 113 is inadequate to bleed chamber 112 fast enough; piston 110 overpowers spring 106 and opens valve 105. This gives a direct rapid venting of brake pipe air to atmosphere.

To dissipate any overcharge in chamber 112 a check valve 117 urged closed by a spring 118 is provided to control a one-way connection from the chamber 112 to auxiliary reservoir 11.

*Description of operation.*

*Normal charging and release.*—Air arriving by brake pipe 6 flows through port 20 to the space above triple piston 40, and moves this downward until arrested by the retard stop 51. In this position air flows through the feed groove 53 to the space within the valve bushing 47, and then flows by way of the port 55 to the auxiliary reservoir 11, charging the same. At the same time air flows from the slide valve chamber through port 56, passage 57, check valve 58, and port 26 to pipe 25 and load reservoir 13. Thus the load reservoir is charged to approximately auxiliary reservoir pressure. At the same time air flows by port 60 to the space below valve 99, which at this time is closed against flow. Flow is also arrested at port 59 in the slide valve seat by the slide valve 46.

Air also flows to the right through port 20 to the space above piston 110 and moving this piston downward charges the reservoir 12 through the charging port 113. The rate of charging is slow, because the clearance between stem 114 and bushing 115 is small. If the chamber 112 should charge at a higher rate than the auxiliary reservoir 11 the chamber valve 117 will open, permitting the excess to flow to the auxiliary reservoir.

Air is exhausted from the service brake cylinder by way of pipe 21, passage 22, port 61, recess 76, port 79, recess 77, and port 63.

Air from the space above the piston 80 is exhausted by way of port 92 which communicates with the service brake cylinder port 22, so that the pressure above the piston 80 is vented concurrently with service brake cylinder pressure.

Assuming that the piston 80 is in its upward position, the air exhausted through port 63 as heretofore described, passes to atmosphere by way of passage 64, port 82 and discharge 85.

*Restricted recharge.*—If the rise of brake pipe pressure is fast enough, a differential of pressure sufficient to overpower the retard stop spring 52 will be created. Such a differential is ordinarily about three and one-half pounds per square inch.

The seating of piston 40 on the end of bushing 47 establishes the restrictive action of port 54 and delays the charging of the auxiliary reservoir. At the same time, the slide valve 46 blanks the port 56, and suspends the charging of the load reservoir 13. It will be observed, however, that the recesses 76, 77, 78 are of such size that the exhaust flow is not throttled by the valve 46.

*Service application, load position.*—In load position the valve 15 is open. If brake pipe pressure is reduced at a service rate the triple piston 40 will be moved upward by the predominating auxiliary reservoir pressure. The graduating valve 43 moves upward, clearing service port 70 and causing recess 74 to connect quick service ports 72, 73. At this point the main valve 46 is picked up by the lug 44 and moved upward.

The first function in such movement is to lap the exhaust port 63, and the next function occurs when ports 68 and 62 are connected by recess 75, port 73, recess 74, and port 72.

This produces a restricted discharge of brake pipe pressure from port 20 through passage 69 and the ports above named, to the service brake cylinder, accelerating the service application. When the piston 40 is arrested by the graduating cup 49 recess 71 registers with port 61 and auxiliary reservoir air flows to the service brake cylinder by way of port 22 and pipe 21.

As the pressure in the brake cylinder builds up it is communicated by port 101 to the lower side of the loaded check valve 102, and when service brake cylinder pressure has reached the proper value assumed to be 5 pounds per square inch, check valve 102 will open and admit service brake cylinder pressure against the upper side of piston 95, moving this downward and unseating valve 99.

The flow of pressure from the load reservoir 13 by way of passages 26 and 60 and through valve 99 supplies pressure fluid through the port 24 and pipe 23 to the load brake cylinder 14, causing piston 31 to move out and causing the latch 34 to engage the rod 37 after this has been drawn out an amount corresponding to the slack in the foundation brake gear.

It will be observed that the pressure in the load brake cylinder is communicated to the lower side of piston 95 by port 24, and consequently when load brake cylinder has built up an amount approximately equalling the pressure in the service brake cylinder 12, the piston 95 will move upward and allow valve 99 again to close.

If brake pipe pressure is reduced at a service rate to a sufficiently low point the piston 40 will overpower the graduating spring 50 slightly. In this position port 68 is blanked by the valve 46, and the flow of brake pipe air to the brake cylinder is definitely terminated.

If the reduction of brake pipe pressure be continued below the point of full equalization (as it is in emergency) the piston 40 will move upward and seat on its gasket, and in this position the valve 46 clears the port 59 and allows equalization between the load reservoir and the auxiliary reservoir. Thus this extra volume of air is available for utilization in full service or in emergency.

*Emergency application.*—As has been explained, the vent valve piston 110 moves upward and vents the chamber 112 at a service rate, if the reduction of brake pipe pressure in port 20 takes place at a service rate. If, however, brake pipe pressure is reduced at a faster rate, piston 110 moves upward to the limit of its motion, stem 104 unseats valve 105, and the brake pipe is vented at a rapid rate through check valve 107 and discharge port 108. This causes piston 40 to move upward to the limit of its motion almost instantly, and thus what is in effect a very rapidly produced full service application is caused.

The sequence of operations is similar to that in a slow movement of full service except virtually no venting of the brake pipe takes place through the port 68 and the load reservoir 13 is immediately placed in communication with the auxiliary reservoir 11.

*Application in light position.*—On unloaded cars the valve 15 is closed, preventing admission of pressure to the load brake cylinder 15. The action of the valve mechanism is the same both in service and in emergency, as it is when the valve 15 is open, but obviously since the cylinder 14 receives no air the pressure beneath the piston 95 will build up very rapidly. The valve 99 will close almost immediately after opening.

It follows that in an emergency or full service application in light position the charge in the load reservoir 13 is retained almost intact and is added to the auxiliary reservoir charge to increase the brake cylinder pressure in full service or emergency.

*Normal release.*—If service brake cylinder pressure has not risen above the critical value, which is assumed to be 25 pounds per square inch, the exhaust restricting piston 80 will remain in its upper position, and exhaust from the entire apparatus, including both brake cylinders (if both are in action) will take place at a rapid rate.

On the other hand, if the service brake cylinder has attained or exceeded the critical pressure, piston 80 will move down during the application and seat in its lower position. This interposes restricted port 83 in the path of the triple valve exhaust.

It will be observed that this controls the exhaust from both brake cylinders and that restricted exhaust takes place regardless of whether restricted recharge is or is not taking place. In other words, the action of retarded release is dependent on the maximum brake cylinder pressure attained, and is independent of the rate of rise of brake cylinder pressure.

Piston 80 and annular rib 88 are so dimensioned that the spring 84 will move piston 80 upward when the pressure in the brake cylinders falls to about seven pounds per square inch or some other suitable value.

It will be observed that the arrangement above described produces a light and load brake of relatively simple construction and having many desirable features, such as restricted recharge, rapid emergency application, either from release position or from a preceding service application, simultaneous release of the light and load brake cylinder, economical use of pressure fluid in the settings for both light and load braking, and the maintenance of reserve pressure for use in emergency and full service in both settings, and particularly in the light setting of the brake.

The restricted release valve is not confined in its utility to light and load brakes, but is available wherever it is desired to control release by the intensity of brake cylinder pressure rather than by the rate of rise of brake pipe pressure.

An important characteristic of this release restricting mechanism is that it functions to restrict release not merely at the front end of the train, but throughout the train, or in certain cases where the brakes are severely applied and then quickly released, throughout a larger portion of the front part of the train than can be secured with prior structures.

What is claimed is:

1. In a light and load brake, the combination of a service brake cylinder; a load brake cylinder normally disconnected from the brake rigging; a latch mechanism operable by the actuation of the load brake cylinder to connect said cylinder operatively with the brake rigging; a valve operable at will to permit or prevent the admission of air to the load brake cylinder; a triple valve controlling the admission of air to the service brake cylinder, and the exhaust of air from both cylinders; and a load cylinder application valve mechanism arranged to be urged in an opening direction by the rise of service brake cylinder pressure, and in a closing direction by load brake cylinder pressure.

2. In a light and load brake the combination of a service brake cylinder; a load brake cylinder normally disconnected from the brake rigging; a latch mechanism operable by the actuation of the load brake cylinder to connect said cylinder operatively with the brake rigging; a valve operable at will to permit or prevent the admission of air to the load brake cylinder; an auxiliary reservoir; a load reservoir; a triple valve controlling the admission of air to the service brake cylinder from the auxiliary reservoir and the exhaust of air from both cylinders; and a load cylinder application valve operable by the rise of pressure in the service brake cylinder to admit air from the load reservoir to the load brake cylinder.

3. In a light and load brake the combination of a service brake cylinder; a load brake cylinder normally disconnected from the brake rigging; a latch mechanism operable by the actuation of the load brake cylinder to connect said cylinder operatively with the brake rigging; a valve operable at will to permit or prevent the admission of air to the load brake cylinder; an auxiliary reservoir; a load reservoir; a triple valve controlling the admission of air to the service brake cylinder from the auxiliary reservoir and the exhaust of air from both cylinders; and a load cylinder application valve mechanism arranged to be urged in an opening direction by the rise of service brake cylinder pressure, and in a closing direction by load brake cylinder pressure, said valve mechanism controlling the flow of load reservoir air to the load brake cylinder.

4. In a light and load brake the combination of a service brake cylinder; a load brake cylinder normally disconnected from the brake rigging; a latch mechanism operable by the actuation of the load brake cylinder to connect said cylinder operatively with the brake rigging; a valve operable at will to permit or prevent the admission of air to the load brake cylinder; an auxiliary reservoir; a load reservoir; a triple valve controlling the admission of air to the service brake cylinder from the auxiliary reservoir and the exhaust of air from both cylinders; a load cylinder application valve operable by the rise of pressure in the service brake cylinder to admit air from the load reservoir to the load brake cylinder; and means rendered effective by the triple valve in full service position to connect said auxiliary and load reservoirs with each other.

5. In a light and load brake the combination of a service brake cylinder; a load brake cylinder normally disconnected from the brake rigging; a latch mechanism operable by the actuation of the load brake cylinder to connect said cylinder operatively with the brake rigging; a valve operable at will to permit or prevent the admission of air to the load brake cylinder; an auxiliary reservoir; a load reservoir; a triple valve controlling the admission of air to the service brake cylinder from the auxiliary reservoir and the exhaust of air from both cylinders; a load cylinder application valve mechanism arranged to be urged in an opening direction by the rise of service brake cylinder pressure, and in a closing direction by load brake cylinder pressure, said valve mechanism controlling the flow of load reservoir air to the load brake cylinder; and means rendered effective by the triple valve in full service position to connect said auxiliary and load reservoirs with each other.

6. In a pneumatic brake system, the combination of a brake pipe; an auxiliary reservoir; an additional reservoir; a triple valve chamber in constant communication with the auxiliary reservoir and having a valve seat provided with a feed port leading to said additional reservoir; a check valve in said port opening toward said additional reservoir; an equalizing port in said seat in free communication with said additional reservoir; a triple cylinder having a charging groove; a triple piston in said cylinder subject to opposing brake pipe and auxiliary reservoir pressures and adapted to permit charging through said groove in release positions; a yielding retard stop tending to arrest said piston in normal release position without yielding; means serving to restrict flow through said charging groove when said retard stop yields; a yielding graduating stop serving to arrest said piston in normal service position without yielding; and a triple slide valve on said seat, arranged to blank said feed port only when said retard stop is overpowered and to open said equalizing port only when said graduating stop is overpowered.

7. In a light and load brake system, the combination of a brake pipe; a service brake cylinder; a load brake cylinder normally disconnected from the brake rigging; a latch mechanism operable by the actuation of the load brake cylinder to connect said cylinder operatively with the brake rigging; a valve operable at will to permit or prevent the admission of air to the load brake cylinder; an auxiliary reservoir; a load reservoir; a triple valve chamber in constant communication with the auxiliary reservoir, and having a valve seat provided with a feed port and an equalizing port both leading to said load reservoir, a service cylinder port, a load cylinder port and an exhaust port; a check valve in said feed port arresting back flow from the reservoir; a triple cylinder having a charging groove; a triple piston in said cylinder subject to opposing brake pipe and auxiliary reservoir pressures and adapted to permit charging through said groove in release positions; a yielding retard stop tending to arrest said piston in normal release position without yielding; means serving to restrict flow through said charging groove when said retard stop yields; a yielding graduating stop serving to arrest said piston in normal service position without yielding; a triple valve on said seat arranged in normal recharge position to connect both brake cylinder ports with exhaust, and blank the equalizing port, when said retard stop is overpowered to continue the connections to the exhaust and blank said feed and equalizing ports, in service position, to blank exhaust and equalizing port and connect the valve chamber with the service brake cylinder port, and when the graduating stop is overpowered to modify the last named conditions by opening said equalizing port to the valve chamber; and a cylinder application valve operable by the rise of pressure in the service brake cylinder to admit air from the load reservoir to the load brake cylinder.

8. In a light and load brake system, the combination of a brake pipe; a service brake cylinder; a load brake cylinder normally disconnected from the brake rigging; a latch mechanism operable by the actuation of the load brake cylinder to connect said cylinder operatively with the brake rigging; a valve operable at will to permit or prevent the admission of air to the load brake cylinder; an auxiliary reservoir; a load reservoir; a triple valve chamber in constant communication with the auxiliary reservoir, and having a valve seat provided with a feed port and an equalizing port both leading to said load reservoir, a service cylinder port, a load cylinder port and an exhaust port; a check valve in said feed port arresting back flow from the reservoir; a triple cylinder having a charging groove; a triple piston in said cylinder subject to opposing brake pipe and auxiliary reservoir pressures and adapted to permit charging through said groove in release positions; a yielding retard stop tending to arrest said piston in normal release position without yielding; means serving to restrict flow through said charging groove when said retard stop yields; a yielding graduating stop serving to arrest said piston in normal service position without yielding; a triple valve on said seat arranged in normal recharge position to connect both brake cylinder ports with exhaust and blank the equalizing port, when said retard stop is overpowered to continue the connections to the exhaust and blank said feed and equalizing ports, in service position to blank exhaust and equalizing port and connect the valve chamber with the service brake cylinder port, and when the graduating stop is overpowered to modify the last named conditions by opening said equalizing port to the valve chamber; and a load cylinder application valve mechanism including a movable abutment subject on opposite sides to pressures in the two brake cylinder ports, and a connected valve controlling the flow of load reservoir air to the load cylinder, and opened by the abutment when service cylinder pressure predominates substantially.

9. In a light and load brake, the combination of a service brake cylinder; a load brake cylinder normally disconnected from the brake rigging; a latch mechanism operable by the actuation of the load brake cylinder to connect said cylinder operatively with the brake rigging; a valve operable at will to permit or prevent the admission of air to the load brake cylinder; a triple valve controlling the admission of air to the service brake cylinder, and the exhaust of air from both cylinders; a load cylinder application valve mechanism arranged to be urged in an opening direction by the rise of service brake cylinder pressure, and in a closing direction by load brake cylinder pressure; and a loaded valve checking the admission of service brake cylinder pressure to said application valve mechanism.

10. In a light and load brake the combination of a service brake cylinder; a load brake cylinder normally disconnected from the brake rigging; a latch mechanism operable by the actuation of the load brake cylinder to connect said cylinder operatively with the brake rigging; a valve operable at will to permit or prevent the admission of air to the load brake cylinder; an auxiliary reservoir; a load reservoir; a triple valve controlling the admission of air to the service brake cylinder from the auxiliary reservoir and the exhaust of air from both cylinders; a load cylinder application valve mechanism arranged to be urged in an opening direction by the rise of service brake cylinder pressure, and in a closing direction by load brake cylinder pressure, said valve mechanism controlling the flow of load reservoir air to the load brake cylinder; and a loaded valve checking the admission of service brake cylinder pressure to said application valve mechanism.

11. The combination with a triple valve having an exhaust port, of a restricted release valve mechanism comprising a valve controlling said exhaust port and having a free exhaust position and a restricted exhaust position; an abutment subject to brake cylinder pressure connected with said exhaust controlling valve and acting under such pressure to urge the valve toward restricting position; and a spring resisting such movement.

12. The combination with a triple valve having an exhaust port, of a restricted release valve mechanism comprising a valve controlling said exhaust port and having a free exhaust position and a restricted exhaust position; an abutment subject to brake cylinder pressure, connected with said exhaust controlling valve, and acting under such pressure to urge the valve toward restricting position, said piston presenting to said pressure a less area in free exhaust position than in restricted exhaust position; and a spring urging the parts toward free exhaust position.

In testimony whereof I have signed my name to this specification.

HENRY F. BICKEL.